United States Patent Office 3,297,740
Patented Jan. 10, 1967

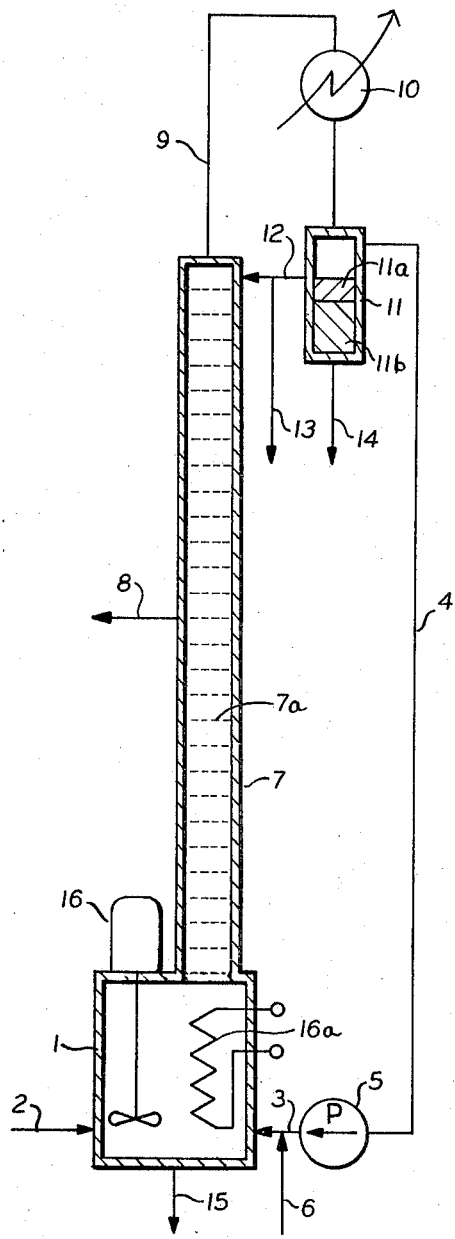

3,297,740
PROCESS FOR THE PRODUCTION OF TRI-METHYL ADIPIC ACID DINITRILE
Karl Schmitt, Herne, Josef Disteldorf, Wanne-Eickel, and Johannes Reiffer, Essen-Heisingen, Germany, assignors to Scholven-Chemie Aktiengesellschaft, Gelsenkirchen-Buer, Germany, a corporation of Germany
Filed Feb. 10, 1964, Ser. No. 343,807
Claims priority, application Germany, Feb. 11, 1963, Sch 32,752
9 Claims. (Cl. 260—465.2)

This invention relates to the production of trimethyl adipic dinitrile and has as its object to provide a precedure adaptable to continuous production of the dinitrile in a convenient manner.

It is known to produce adipic dinitrile from adipic acid by vapor phase reaction of adipic acid and ammonia, and it has been proposed to utilize a liquid phase reaction for this process. The gas phase reaction can be used in a continuous manner, but difficulty has been encountered in operating the liquid phase reaction in a continuous manner since difficulty is encountered by reason of the tendency of the mass resulting from the reaction to harden, making working-up of the product difficult. So far as is known, a liquid phase product has not been used on an industrial scale.

It has been found that trimethyl adipic dinitrile can be produced from trimethyl adipic acid and ammonia by a liquid phase reaction adaptable to continuous operation, by using as a solvent for the trimethyl adipic acid, the residue formed in the reaction. In the process of the invention, the trimethyl adipic acid and ammonia are contacted at a temperature and for a time sufficient to produce the dinitrile, low boiling by-products, and a high boiling residue. The temperature can be sufficient to distill off the trimethyl adipic nitrile and the low boiling by-products while leaving the residue in liquid phase. A hold-up of the residue is maintained so that residue is utilized as reaction medium. The amount of the residue reaction medium is sufficient so that the trimethyl adipic acid dissolves in the residue. The trimethyl adipic acid and ammonia can be added continuously to the residue, while residue can be withdrawn continuously or intermittently in an amount corresponding with its production.

The amount of residue formed in the process is not great, and the amount of trimethyl adipic acid lost by reason of residue withdrawal is not substantial. Further, the residue does not thicken or harden to an objectionable extent; it can be stirred by available stirring means.

The temperature of the residue can be in the range of about 240–290° C. A catalyst as is known for the production of adipic dinitrile from adipic acid can be included in the reaction medium. Thus, acid catalysts can be used, for example phosphoric acid. Also, phosphoric acid salts can be used.

The trimethyl adipic acid starting material can be a pure acid. It can be a pure isomeric mixture of the $\alpha,\alpha,\gamma$- and $\alpha,\gamma,\gamma$-trimethyl adipic acid as can be produced by oxidation of a cyclohexane derivative, for example, trimethyl cyclohexanol, trimethyl cyclohexanone, or mixtures of these materials. The oxidation can be with nitric acid at an elevated temperature, for example, above 65° C. If trimethyl cyclohexanol is used, then the temperature can be below 65° C., for example approximately 40–50° C. The reactants can be used in quantities such that the weight ratio of nitric acid to starting material is less than about 3.5:1, and this ratio should not be below the stoichiometric amount. Nitric acid recovered from a preceding run and containing some trialkyl adipic acid can be utilized as the oxidation agent. With respect to production of the trimethyl adipic acid as is described here, reference is made to German DAS 1,111,163. In this German process, the product, trimethyl adipic acid, is obtained as a crystal product. This crystal product can be used as the starting material in the instant invention. The trimethyl adipic acid is obtained initially, however, as a component of an oily mixture. The crystalline form is obtained by treatment of this oil. In the process of the invention, the oily mixture can be used. Thus, in the process of the German disclosure referred to, the initial product can be cooled whereupon an oil phase and an aqueous phase form. The aqueous phase can be separated from the oil phase, and can then be subjected to a treatment to remove nitrous gases retained thereby, as by passing a gas such as air, nitrogen, or water vapor through the separated oil phase.

Regarding advantages of the process of the invention, as mentioned above, the amount of residue is small. As compared with other procedures, the amount of residue can be about 3–4% as against 10–15% for known procedures. Further, the catalyst requirements are small and can be as little as 0.1–0.5%, or even less, referred to the acid introduced. Further, the process permits the efficient utilization of energy.

The process of the invention can advantageously be carried out in distillation apparatus which includes a fractionating section and a reboiler for supplying vapor to the fractionating section. The trimethyl adipic acid and ammonia can be contacted in a lower portion of the apparatus at a temperature and for a time sufficient to form the dinitrile from the adipic acid, to further form low boiling organic by-products, and also the high boiling reaction residue. Portions of the materials are collected in the reboiler in liquid phase and this material is heated to provide vapor for the fractionation. This vapor is fractionated in the fractionating section to form a fraction rich in dinitrile at an intermedate point in the column, and a dinitrile fraction can be withdrawn from such intermediate point. Low boiling organic by-products rise above the dinitrile draw off and can be condensed and condensate thereby obtained can be utilized as reflux for the column. The desired hold-up of residue can be obtained by suitably throttling the rebroiler residue draw off. The low boiling by-products can include organic compounds and water, and both the organic compounds and water can be condensed and collected in a receiver, wherein a separation is allowed to occur to provide an aqueous phase and an organic phase. The organic phase can be utilized as recycle, whereas the aqueous phase can be discarded.

The invention is further illustrated in the accompanying drawing. Thus, the process can be practiced in distillation apparatus including the reboiler 1, and the distillation column 7, having plates 7a. Trimethyl adipic acid is introduced into the reboiler through line 2, and ammonia is introduced into the reboiler via line 3. A hold-up of residue is maintained in the reboiler by suitably throttling the flow of residue through line 15. The reboiler is outfitted with an agitator 16 and a heater 16a. Suitable heat is supplied to the material in the reboiler so that vapor for fractionation rises to the column 7. In the fractionation section, enrichment in the desired dinitrile occurs so that at about the middle of the column a initrile rich fraction suitable for withdrawal and working up to a product of appropriate purity, is obtained. Such a dinitrile fraction can be withdrawn through line 8. The vapor rising above the dinitrile draw-off 8 is rich in by-products. It contains trimethyl cyclopentanone, and traces of carbon dioxide, as well as water. Also included in this vapor is the excess ammonia. The overhead vapor passes through line 9 to condenser 10 wherein condensables are liquified while the ammonia remains in the gas state. From the condenser, the resulting admixture passes to a collector 11 wherein an organic layer 11a and an aqueous layer 11b form. Some of the organic material is passed through line 12 to the column for use as reflux, while a portion of this material is withdrawn as a purge via line 13. Water is withdrawn from the separator 11 via line 14, and can be treated, if desired, for recovery of ammonia therefrom. The ammonia gas which enters the separator 11 passes via line 4 to the blower 5, and this blower forces ammonia gas through line 3 and back to the reboiler 1. Make-up ammonia is passed via line 6 to line 3.

The invention is further illustrated in the following examples.

*Example 1*

An apparatus as shown in the drawing, the volume of liquid material in the reboiler is maintained at 15 l. and there is added to this 1.5 kg./hr. of an oily oxidation product obtained by oxidation of a trimethyl cyclohexane derivative with nitric acid and separating water from the initial oxidation product, as is described above. This oily material is composed of 87% trimethyl adipic acid isomers, 5% water, and about 8% short chain dicarboxylic acids. To the trimethyl adipic acid, 0.05% phosphoric acid is added as catalyst. 1.2 m.$^3$/hr. of gaseous ammonia is added, and about 400 l. of this is fresh ammonia, while the balance is recycle ammonia. The reaction temperature is about 260° C., and atmospheric pressure is employed. Under these load and temperature conditions, the liquid phase in the reboiler is about 85% residue and 15% trimethyl adipic acid, so that the residence time for the unconverted trimethyl adipic acid is about 1½ hours. A reflux rate of about 3 kg./hr. is used and at the side outlet, the temperature is approximately 180° C. The temperature at the top of the column is about 60–65° C. About 1.10 kg./hr. of raw dinitrile is withdrawn at the side outlet. This corresponds to a yield of 90% of theory. The overhead is composed of about 750 g./hr. water containing ammonia, 33 g./hr. trimethyl cyclopentanone, and from the reboiler, 40 g./hr. of residue are removed.

*Example 2*

The procedure described in Example 1 is utilized except that crystallized trimethyl adipic acid is used as starting material. 1.5 kg./hr. of the crystal acid is introduced into the reboiler. 1.07 kg./hr. of raw dinitrile is withdrawn from the side outlet. This corresponds to a yield of 89% of theory. The water produced is 750 g./hr., the trimethyl cyclopentanone produced is 43 g./hr. and the withdrawal of residue is 50 g./hr.

The proportion of residue to trimethyl adipic acid in the reaction zone or reboiler can be about 65–90% residue, and the balance or 35–10% acid.

While the invention has been described in respect to particular embodiments thereof, these embodiments are merely representative of the invention, and do not serve to define the limits thereof.

What is claimed is:

1. Process for production of 2,2,4- or 2,4,4-trimethyl adipic dinitrile or a mixture thereof by reaction of corresponding trimethyl adipic acid and ammonia which comprises effecting the reaction in distillation apparatus including a fractionating section and a reboiler for supplying vapor to the fractionating section by contacting trimethyl adipic acid with ammonia in a lower portion of the apparatus at a temperature and for a time sufficient to form said dinitrile from the adipic acid, low boiling organic by-products, and a high boiling reaction residue, collecting portions of the said materials in the reboiler in liquid phase, heating material in the reboiler to provide vapor for fractionation, fractionating said vapor in the fractionating section to form a fraction rich in the dinitrile at an intermediate point in the column, withdrawing dinitrile from the column at said intermediate point, and condensing low boiling organic by-products and utilizing resulting condensate as reflux for the column.

2. Process for production of 2,2,4- or 2,4,4-trimethyl adipic dinitrile or a mixture thereof by reaction of corresponding trimethyl adipic acid and ammonia to form the dinitrile, low boiling by-products and high boiling residue, said process comprising effecting the reaction in distillation apparatus including a fractionating section and a reboiler for supplying vapor to the fractionating section by contacting trimethyl adipic acid with ammonia in the reboiler at a temperature and for a time sufficient to form said dinitrile from the adipic acid and a high boiling reaction residue, heating material in the reboiler to vaporize a portion thereof, fractionating said vapor in the fractionating section to form a fraction rich in the dinitrile at an intermediate point in the column and a fraction rich in low boiling by-products at a higher point in the column, withdrawing dinitrile from the column at said intermediate point, condensing low boiling fraction rising above said intermediate point as vapor, utilizing condensate for reflux in the column, and withdrawing residue in liquid phase from the reboiler.

3. Process according to claim 2, wherein the trimethyl adipic acid is introduced into the reboiler and a hold-up of residue is maintained in the reboiler in an amount sufficient to dissolve the trimethyl adipic acid introduced into the reboiler.

4. Process according to claim 2, wherein the trimethyl adipic acid is contained in an oil resulting from production of the trimethyl adipic acid by oxidation of cyclohexane derivative selected from the group consisting of trimethyl cyclohexanol and trimethylcyclohexanone.

5. Process according to claim 3, wherein said low boiling by-products including organic compounds and water, said condensate include water and organic compounds and forms an aqueous phase and an organic phase, said phases are separated and the organic phase is utilized as reflux.

6. Process according to claim 3, wherein a catalyst for the reaction of adipic acid and ammonia to produce the dinitrile is used.

7. In a process for production of 2,2,4- or 2,4,4-trimethyl adipic dinitrile or a mixture thereof by reaction of corresponding trimethyl adipic acid and ammonia to form the dinitrile, and high boiling residue, the improvement which comprises utilizing said residue as a solvent for the trimethyl adipic acid by combining residue and the adipic acid to dissolve the adipic acid in the residue to form a solution of the adipic acid and residue, and contacting ammonia with the residue containing the trimethyl adipic acid at a temperature and for a time sufficient to form the dinitrile.

8. Process according to claim 7, wherein the temperature is sufficient to distill the dinitrile formed, and the process is operated continuously by continuous addition of adipic acid to residue, continuous withdrawal of dinitrile as vapor and withdrawal of residue, a hold-up of residue being maintained to provide said solvent.

9. Process according to claim 7, wherein said contacting is at a temperature of about 240–290° C., the pressure is atmospheric, and the reaction is carried out in the presence of an acid catalyst.

References Cited by the Examiner

UNITED STATES PATENTS

| | | | |
|---|---|---|---|
| 2,132,849 | 10/1938 | Greenewalt et al. | 260—465.2 |
| 2,794,043 | 5/1957 | Jansen et al. | 260—465.2 |
| 2,808,426 | 10/1957 | Potts et al. | 260—465.2 |

FOREIGN PATENTS

| | | |
|---|---|---|
| 1,111,163 | 7/1961 | Germany. |

CHARLES B. PARKER, *Primary Examiner.*

JOSEPH P. BRUST, *Examiner.*